(12) United States Patent
Martin et al.

(10) Patent No.: US 6,220,317 B1
(45) Date of Patent: Apr. 24, 2001

(54) ROUTER TEMPLATE ASSEMBLY

(75) Inventors: Michael D. Martin, Cicero; Charles S. Morel; Richard A. Coon, both of Liverpool, all of NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/421,743

(22) Filed: Oct. 20, 1999

(51) Int. Cl.$^7$ ................................................ B27M 3/00
(52) U.S. Cl. .................. 144/372; 144/144.1; 144/144.51
(58) Field of Search ................. 144/144.1, 144.51, 144/144.52, 137, 27, 372; 409/125, 130, 182

(56) References Cited

U.S. PATENT DOCUMENTS

| | | |
|---|---|---|
| D. 298,421 | 11/1988 | Tyroff . |
| D. 306,250 * | 2/1990 | Kyrklund ........................ 144/144.52 |
| 3,789,892 * | 2/1974 | Converse et al. ............... 144/144.51 |
| 3,842,510 | 10/1974 | Elliott . |
| 4,202,388 * | 5/1980 | Wieting ............................ 144/144.51 |
| 4,750,271 | 6/1988 | Ericksen . |
| 4,793,069 | 12/1988 | McDowell . |
| 4,901,447 | 2/1990 | Gottschalk . |
| 5,111,593 | 5/1992 | Gehen, Sr. . |
| 5,222,303 | 6/1993 | Jardine . |
| 5,279,343 | 1/1994 | Woods . |
| 5,325,899 * | 7/1994 | Kochling ......................... 144/144.52 |
| 5,630,281 | 5/1997 | Pledger et al. . |
| 5,758,430 | 6/1998 | Holloway . |
| 5,775,395 * | 7/1998 | Wilkins .............................. 144/144.1 |
| 5,813,130 | 9/1998 | MacDowell . |
| 5,893,402 * | 4/1999 | Darling ............................ 144/144.52 |

* cited by examiner

Primary Examiner—W. Donald Bray
(74) Attorney, Agent, or Firm—Wall Marjama & Bilinski

(57) ABSTRACT

An adjustable template assembly for a router to assist in cutting junction box apertures at preselectable positions in wall surfaces which may be vertically or horizontally disposed.

25 Claims, 6 Drawing Sheets

FIG. 17

ROUTER TEMPLATE ASSEMBLY

FIELD OF THE INVENTION

This invention relates to a template assembly useful for the placement of apertures for junction boxes and other electrical power and communication devices that accommodate switches, receptacles, telephone outlets, data outlets, and the like. It relates in particular to the provision of a guide for a router used in cutting such apertures.

BACKGROUND OF THE INVENTION

During a remodeling or new construction project, electricians or drywallers are required to appropriately place in sheetrock or other wall materials apertures where junction boxes and other electrical power and communication devices will be located. When measuring for the cut-out sections in the walls, the installer will typically use a ruler to measure the appropriate location of the cut-out, and then trace a junction box with a pencil to outline the shape to be cut out. The marking and cutting out of junction box locations by this procedure requires a considerable amount of time and labor. Due to the time constraints and high cost of labor involved in construction projects, there is a great need for a device which will expedite the locating of cut-outs on new and existing walls to accommodate boxes for devices. Additionally, the traced outline is then cut with a saw, a router or other cutting instrument, following the traced line. If the operator of the cutting instrument misdirects the cutter, the cut may not be appropriately sized.

SUMMARY OF THE INVENTION

While previous inventions have provided templates which facilitate the locating of positions for cutouts, the present invention not only assists in properly locating cutouts, but meets a further need by providing a guide for the tool used in cutting apertures in walls to accommodate junction boxes and other electrical power and communication devices. Further, the present invention provides a template that not only assists in cutting of such apertures in a vertical wall, but also in cutting of such apertures in horizontally disposed walls boards, as are encountered in the manufactured housing industry, modular housing industry and recreational vehicle industry.

The device is used to control the cuts made in drywall and other applicable materials by routers. It expedites the process by allowing an adjustable "ladder" type template assembly to be preset at the installer's predetermined wall box height. The dimensional cut of a hole is controlled with sliding templates that can be set to any desired height and used to guide the router bit by means of a collar fitted so that the router performs the cut in the drywall while tracing the inside edge of either a single gang or a double gang template. The device is designed to work particularly well in fast-paced, repetitious environments such as at construction sites or in the aforementioned housing and recreational vehicle industries.

In most commercial and domestic building environments, junction boxes are commonly positioned at either of two standard heights above floor level. Typically, electrical outlets are centered at a height of one foot, while switches are at a four-foot height. The present invention preferably has two templates, one corresponding to each height, but capable of adjustment in half-inch increments to take account of variations in local construction practices or building codes.

In summary, it is a purpose of this invention to provide a template assembly which functions as a guide for a router in repetitiously cutting apertures at standard heights in walls to accommodate electrical fixtures.

It is further a purpose of this invention to provide a template assembly which functions as a guide for a router in repetitiously cutting apertures at two standard heights in walls to accommodate electrical fixtures, both heights being readily adjustable to meet variations in standards.

It is further a purpose of this invention to provide a template assembly which functions as a guide for a router in repetitiously cutting apertures at two heights in walls to accommodate electrical fixtures, the assembly being easily and reversibly dismantled into compact portable sections.

It is further a purpose of this invention to provide a template assembly which can readily be configured as a guide for repetitiously cutting apertures at standard heights either in vertical walls or in horizontally positioned wall boards.

It is further a purpose of this invention to provide a template assembly which functions as a guide for a router in repetitiously cutting apertures at standard heights in walls to accommodate electrical fixtures, the assembly having templates which are easily and reversibly removable for independent use in non-standard applications.

It is finally a purpose of this invention to provide a template assembly which functions as a guide for a router in repetitiously cutting apertures at standard heights in walls to accommodate electrical fixtures, the assembly being readily adaptable by the user to be operable in more confined spaces than normal.

DETAILED DESCRIPTION OF THE PREFERRED EMBODIMENT

Figure 1:
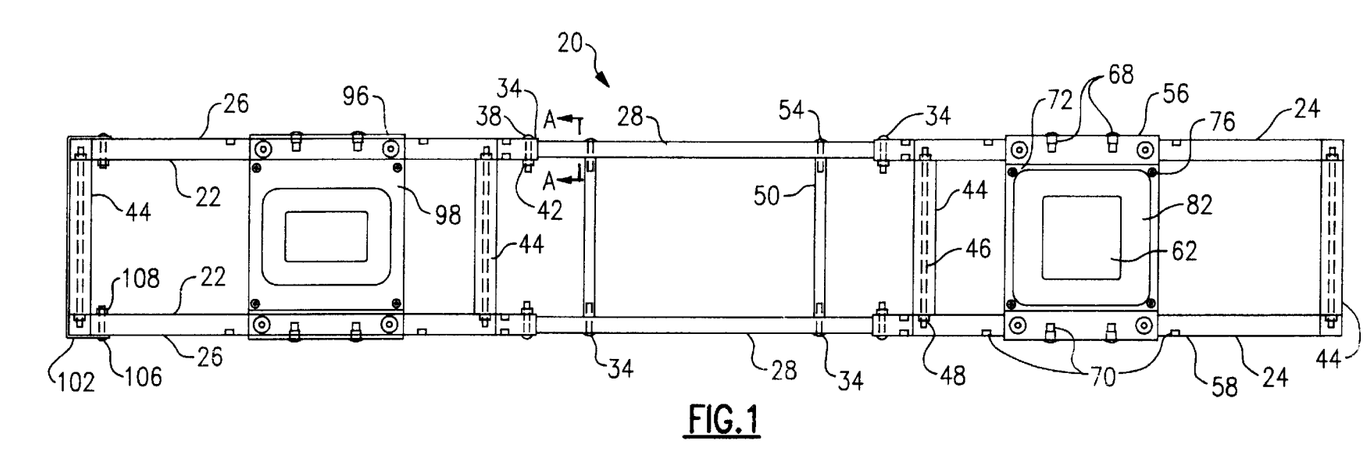
FIG. 1 is a plan view of a template assembly according to various embodiments of this invention.
Figure 2:
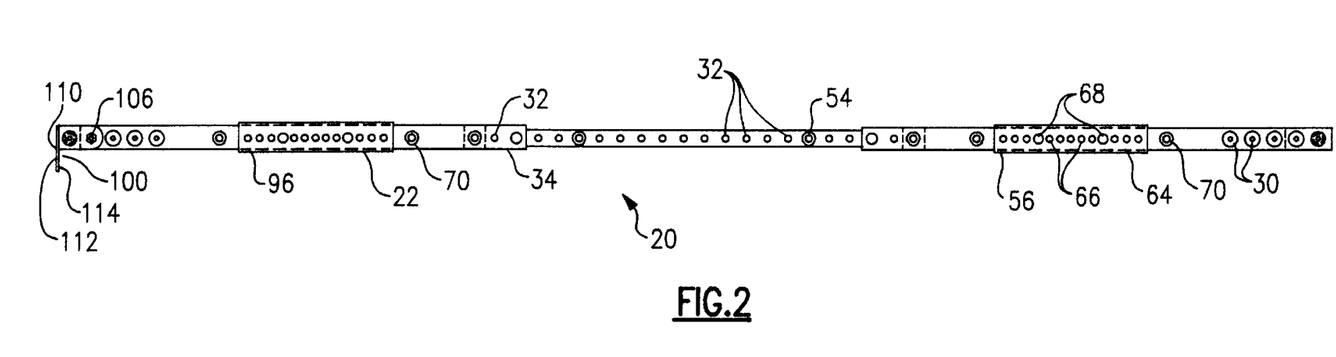
FIG. 2 is a side view of the assembly of FIG. 1.

FIGS. 1 and 2 illustrate a template assembly 20 according to various preferred embodiments. Template assembly 20 has two metal parallel rails 22, each of which is comprised of a first end member 24, a generally similar second end member 26, and a central member 28 extending therebetween. In the illustrated embodiment, first end members 24 and second end members 26 have a square cross-section tubular construction, and central members 28 have a round tubular construction. Each end member 24, 26 has a plurality of holes 30 transversely aligned in pairs along the length of the members, some of which are mechanically functional, as will be seen, while others may be present for the purpose of reducing weight of the overall assembly. Central members 28 have a plurality of holes 32, also transversely aligned in pairs, which are preferably equally spaced along the length of members 28. Similarly to holes 30 in end members 24 and 26, several of the holes 32 have mechanical functions, but others may be included to reduce the weight of the overall assembly. In the following description, the various holes in rails 22 used for attachment purposes are comprised among holes 30 or 32, as appropriate.

Figure 3:
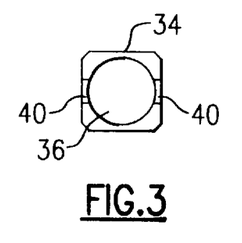
FIG. 3 is an end elevation of an adapter.
Figure 4:
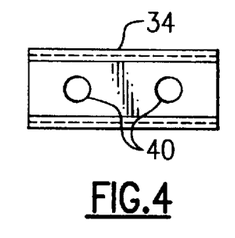
FIG. 4 is a side elevation of an adapter.
Figure 5:
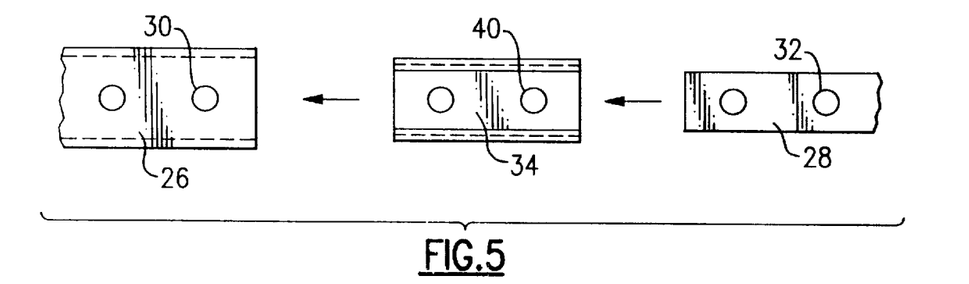
FIG. 5 has a side elevation of an adapter and members of a rail.
Figure 6:
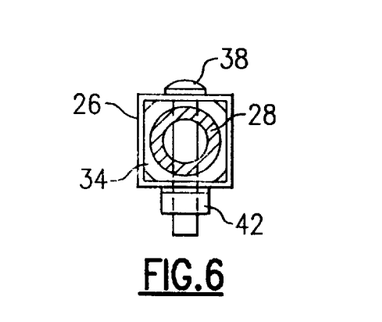
FIG. 6 is a cross-sectional view taken along line A—A of FIG. 1.

The central member 28 engages with the end members 24 and 26 as follows. An adapter 34, shown in more detail in FIGS. 3, 4 and 5 is located at an extremity of each member 24 and 26. The adapters 34 have generally square cross section and are sized to have an interference-fit when inserted into the extremity of each end member 24 and 26. Each adapter 34 has a longitudinal cylindrical hole 36 extending through its entire length. With the complete length of adapter 34 inserted inside the extremity of end member 24 or 26, an end of central member 28 is inserted into the cylindrical hole 32, the diameter of which is sized to provide a snug fit for central member 28, while allowing removal if desired. In the illustrated embodiment, four adapters 34 are located at the four locations where central members 28 are connected to end members 24 and 26. The exploded view of FIG. 5 shows how an adapter 34 is used to engage central member 28 with, for example, second end member 26. FIG. 6 is a cross-section view taken along line A—A of FIG. 1, and illustrates the aforementioned members secured together by a fastener 38, such as a screw or bolt, which passes through a hole 30 in end member 26, a hole 32 in central member 28, and a hole 40 in adapter 34, each of these holes being aligned with one another. In the illustrated embodiment, fastener 38 is tightened by engaging with a nut 42.

Figure 7:
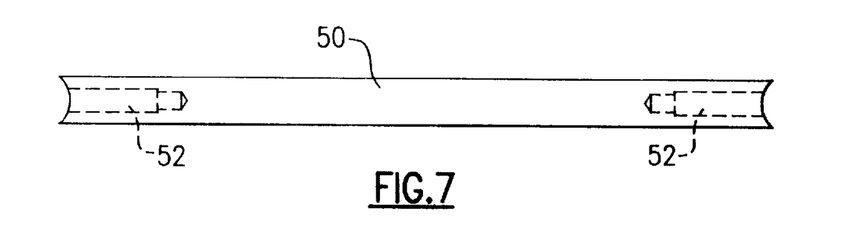
FIG. 7 is a plan view of a round crossbar.

The rails 22 thus formed are connected by various crossbars and are parallel to one another. The first end members 24 are joined by crossbars 44 at their outer ends and at a point near adapters 34. In the illustrated embodiment, the crossbars 44 have a square cross section tubular construction, and are attached to the members 24 at one pair of holes 30 with fasteners, for example, threaded rods 46 that extend all the way through the crossbars interiors and through the inner wall of each end member 24 to engage with nuts 48. The second end members 26 are similarly connected to one another with crossbars 44 and threaded rods 46. Round crossbars 50, shown in more detail in FIG. 7, connect the central members 28 to one another with fasteners, for example, with screws 54 that extend through selected pairs of holes 32 in the central members 28 and engage with threaded holes 52 in each end of crossbars 50. The structure which has been described up to this point, comprising the parallel rails 22 connected by several cross members 44 and 54, resembles a ladder.

Figure 8:
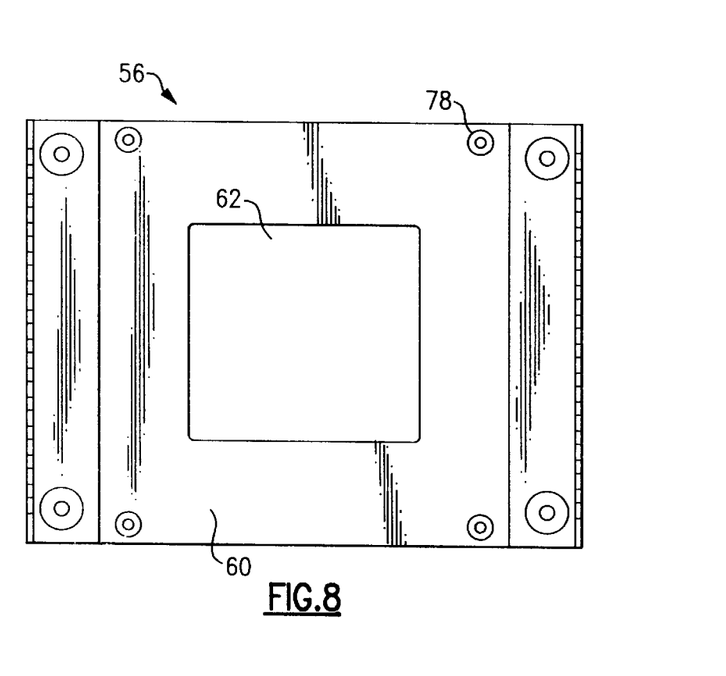
FIGS. 8, 9 and 10 show a slide in plan and end and side elevations.
Figure 9:
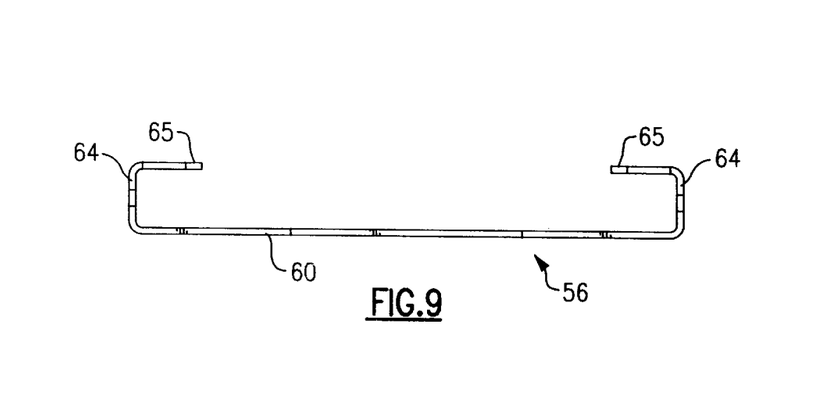
Figure 10:
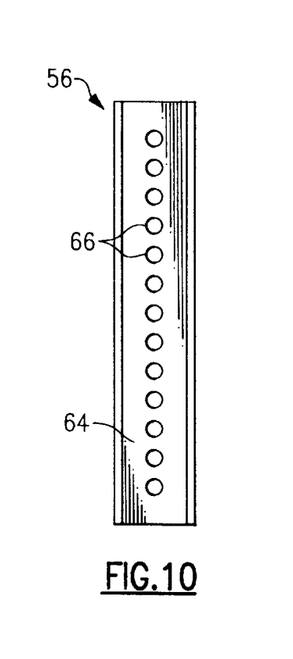

FIGS. 8, 9 and 10 illustrate a slide 56 that is slidingly disposed on two opposed end members 24. In the illustrated embodiment slide 56 has a generally rectangular shape, and may be fabricated from a rectangular section of sheet metal that is shaped to provide the profile seen in FIG. 9. Specifically, the rectangular section of sheet metal is first bent perpendicularly to its original plane along lines defined by the distance between the outermost sides 58 of first end members 24, then bent inward along lines defined by the thickness of an individual end member 24. Alternately, slide 56 may be molded from a plastic or formed from another relatively rigid material. In any even, the slide 56 is preferably comprised of a main area 60, sides 64 and flanges 65, which, when slide 56 is in position, the sides 64 and flanges 65 wrap around both the first end members 24 in such a way that slide 56 is generally free to move in either direction along the first end members 24, unless attached to the end members 24 as described below. Slide 56 has in its main area 60 a rectangular opening 62 which allows access by a router bit to a surface into which it is desired to cut an aperture.

Slide 56 has drilled along its sides 64 a plurality of transversely disposed holes 66 spaced relatively closely together, for example, holes with centers spaced in 0.5-inch (12.7 mm) increments. Holes 66 are adapted to receive a fastener to prevent slide 56 from sliding along end members 24. In other words, holes 66 are aligned with holes 30 in the end members 24, and fasteners are inserted in the aligned holes to lock the slide 56 at a predetermined position along end members 24. In the illustrated embodiment, such fasteners comprise screws 68 which engage with press-in locknuts 70 that are disposed in four positions along outermost sides 58 of first end members 24, the locknuts 70 being recessed in sides 58 so as not to interfere with the positioning of slide 56. The separation between adjacent locknuts 70 is an exact multiple of the incremental separation of holes 66 in slide 56. In other words, the combined effect of having several positions for locknuts 70, and multiple holes 66 in slide 56, is to provide a wide range of positions at which the slide 56 can be attached to first end members 24, in small increments defined by the incremental spacing between holes 66.

Figure 11:
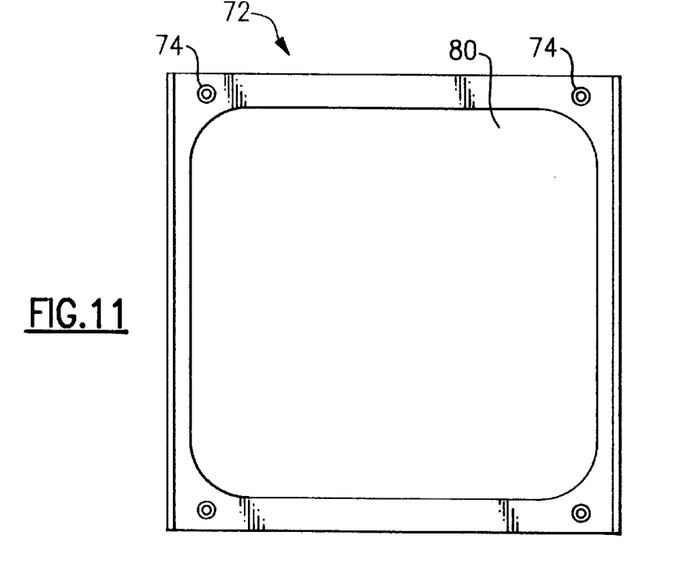
FIGS. 11 and 12 show a template in plan and end elevation.
Figure 12:
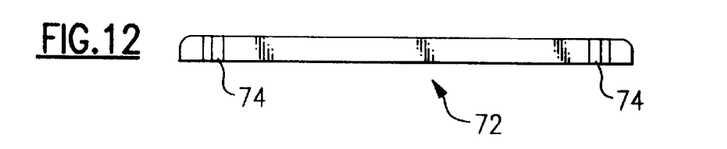

A template 72, shown in more detail in FIGS. 11 and 12, may be fabricated from a metal plate or other relatively rigid material, and preferably has a generally rectangular shape. Near each corner of template 72 are holes 74 which are sized to provide clearance for fasteners, such as screws 76, by which template 74 is affixed to slide 56. In the illustrated embodiment, screws 76 engage with corresponding threaded holes 78 near the corners of slide 56. Template 72 has a generally rectangular opening 80 which is larger than the opening 60 in slide 56, thus leaving a portion of main area 60 of slide 56 exposed to form a shelf 82. Besides being used as part of template assembly 20, template 72 may be used independently for a non-routine application which demands the corresponding aperture size of opening 80; for example, template 72 may be removed from slide 56 and fastened through holes 74 directly into a work surface, such as a piece of plywood, to enable the cutting of an aperture therein.

Figure 13:
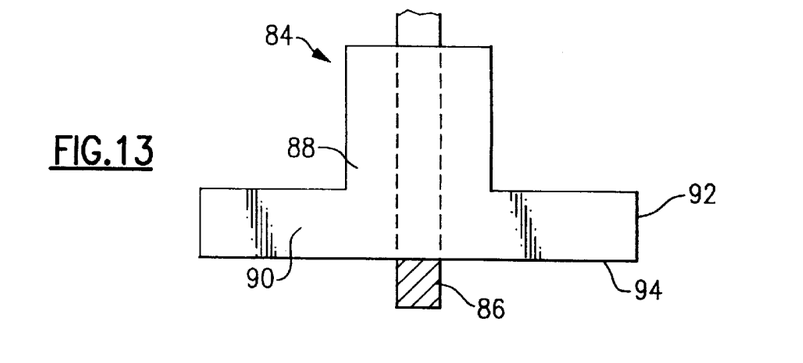
FIG. 13 shows a side elevation of a collar engaged with a router bit.
Figure 17:
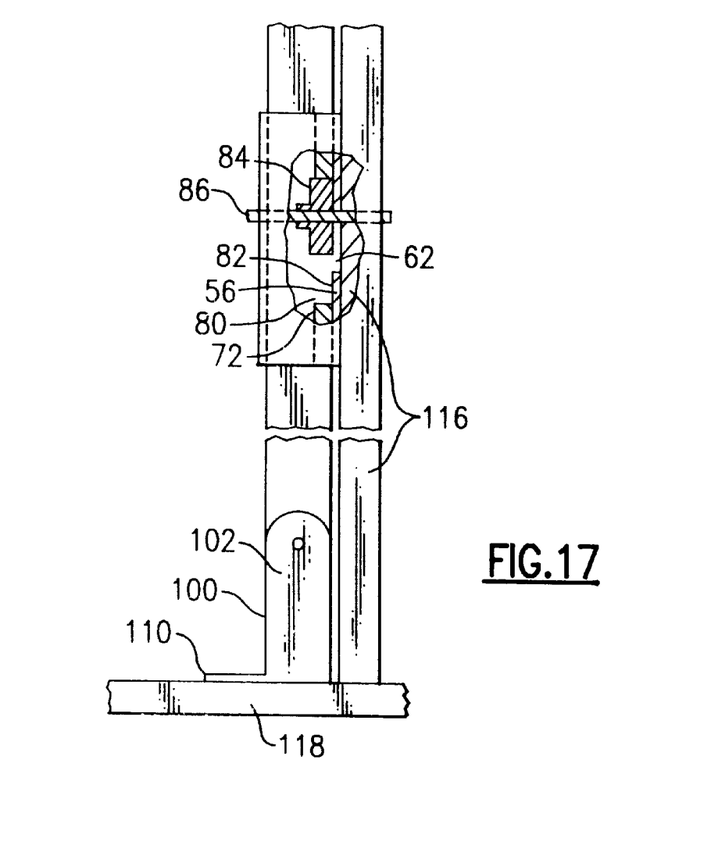
FIGS. 17 and 18 show partial side elevations of the assembly with cutaways to show in cross-section its disposition relative to a routing tool and, respectively, to a vertical wall and a horizontal board.
Figure 18:
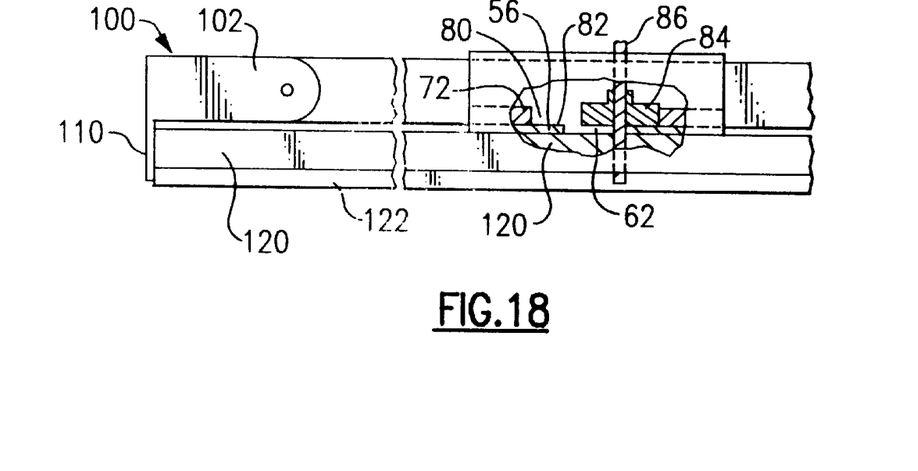

The opening 80 in template 72 is sized to engage with a circular spacing collar 84 which is concentrically attached to a router bit 86, as in various conventional routers. The collar 84 and bit 86 are shown in FIG. 13, and FIGS. 17 and 18 illustrate two configurations of a collar with a bit positioned in template 72. Collar 84 has a cylindrical stem 88 integral with a cylindrical end portion 90 that includes a side 92 and a bottom surface 94. Bit 86 projects far enough below surface 94 of collar 84 to pass entirely through the article being cut out, allowing for the relevant thickness of slide 56. When the tool is in operation, the bit 86 rotates in conjunction with collar 84. In the following, it is assumed that the template assembly 20 is in position against a wall or board or other surface into which an aperture is to be cut. The bottom surface 94 of collar 84 is positioned squarely on the shelf surface 82 in order to provide stability for the routing tool. With the router motor engaged, the operator moves the router so that the side 92 of the collar 84 is in contact with the shoulder formed by opening 80 of template 72, using this shoulder to trace the path defined by the template opening 80 until the entire area perimeter of the opening has been followed, at which point a section of wall or board material will have been completely severed from its surrounding area, causing an aperture to be formed. The end portion 90 of collar 84 has a predetermined, standard diameter, and the template opening is sized accordingly to accommodate the diameter of collar 84 and provide the desired, correctly sized aperture removed from the work surface by the cutting operation.

The foregoing description has concentrated on slide 56 and template 72, which are associated with the first end members 24. Referring to FIG. 1, a second slide 96 and a second template 98, located along end members 26, have a similar construction as first slide 56 and first template 72, respectively. However, in the embodiment illustrated in FIG. 1, the openings of slide 56 and of template 72 are sized, in conjunction with the diameter of collar 84, to yield a double gang aperture from the cutting operation, that is, for a situation in which two switches or outlets are to be mounted side-by-side, whereas the second slide 96 and the second template 98 have smaller openings designed for a single gang aperture.

Figure 14:
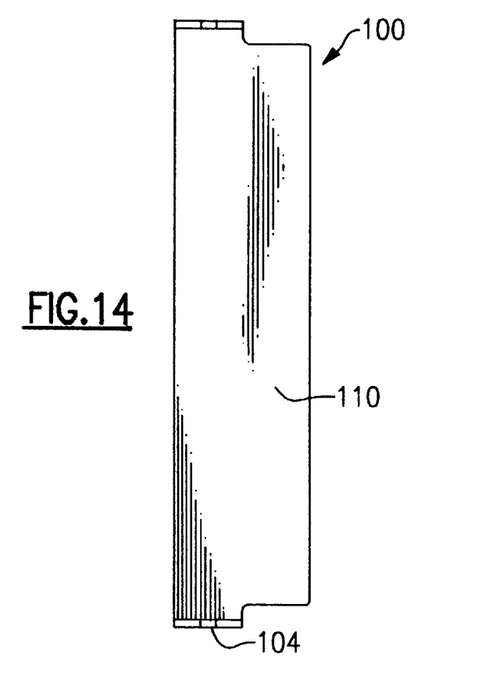
FIGS. 14, 15 and 16 show an end piece in plan and side and end elevations.
Figure 15:
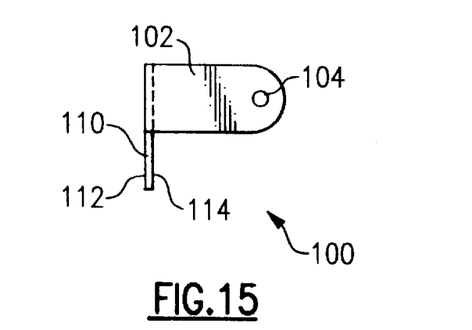
Figure 16:
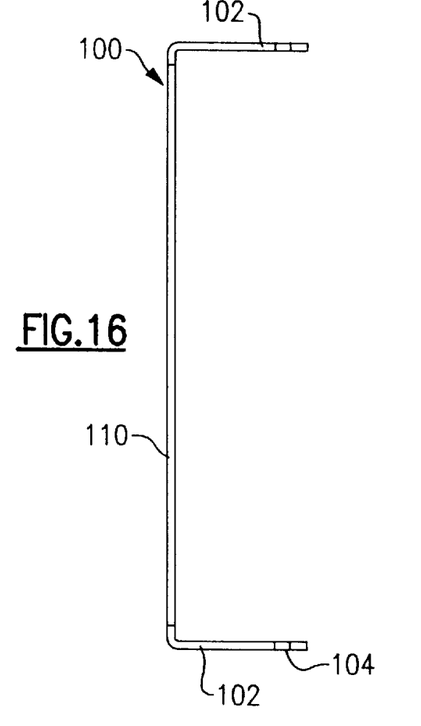

FIGS. 14, 15 and 16 illustrate in detail the end piece 100 extending between the ends of end members 26. End piece 100 serves as a guide for the assembly. As viewed in FIG. 16, end piece 100 is generally U-shaped, comprised of a central flat portion 101 and brackets 102. The end piece 100 is adapted for connection to both the second end members 26, for example, with fasteners such as bolts 106 and nuts 108 received in holes 104 aligned with holes 30 in end members 22.

In FIGS. 14 and 15, a flat portion 110 can be seen, which is also shown in FIG. 2 projecting perpendicularly from the rails 22. The end piece 100 is designed to be attached to second end members 26 so that both an outer surface 112 and an inner surface 114 are squarely aligned with respect to the longitudinal direction of the template assembly 20.

End piece 100 allows template assembly 20 to function in either of two modes. In one mode, it can be used at a building or remodeling location, where a wall is already in position. In this case, assembly 20 is vertically disposed in a chosen location against the wall, with the outer surface 112 of end piece 100 placed flat against a floor to aid in achieving a correct vertical alignment. In another mode, it can be used in prefabrication environments, such as are encountered in the manufactured housing, modular housing and recreational vehicle industries. In these industries, wall materials are frequently handled in a horizontal plane while resting on a support table. In such a case a wall board is lined up with an edge of the table, and the template assembly 20 is positioned appropriately, using the inner surface 114 of end piece 100 against the table edge to aid in aligning the template assembly 20 with the workpiece supported on the table support surface.

It should be emphasized that the orientation of the end piece 100 with respect to rails 22, and slides 56 and/or 96 thereon, differs between the aforementioned modes of use. FIGS. 17 and 18 show side elevations of template assembly 20 partially cut away to show in cross-section the orientation of the end piece with respect to a slide 56 including template 72.

In FIG. 17, the template assembly 20 is oriented vertically against an existing wall 116; the end piece 100 has its surface 112 of the flat portion 110 placed flush against the floor 118 and projecting away from the wall to allow the slide 56 to be disposed flush against the wall. However, when the assembly 20 is used as in FIG. 18, with a board 120 disposed on a horizontal table 122, end piece 100 is reoriented to project downwards so that surface 114 can engage with the edge of table 122 and workpiece 120. It is evident, therefore, from FIGS. 17 and 18 that the flat portion 110 of end piece 100 projects in opposite directions for the two modes of use. This is simply achieved by disengaging the fasteners, for example screws 34 and nuts 42, from second end members 26, then removing end piece 100, reversing its orientation, and finally reattaching it to second end members 26. Since the template assembly 20 is intended for repetitious operations, it would be comparatively rare for a given user to change the mode of use, and reversal of end piece 100 would not be an inconvenience; in all probability it would be a once-only operation. On the other hand, from the point of view of the fabricator, the versatility of the making same item for both modes of application represents a saving in manufacturing cost which can be passed on to the customer.

Accordingly, end piece 100 defines the bottom of the template assembly 20. It is normally more frequent to have double gang situations in higher positions above floor level, as for example with light switches, and to have single ganging at lower levels, as represented by power outlets. It would therefore be most common for the different sized templates of this invention to be placed with the smaller template nearer to the bottom of assembly 20, and the larger template nearer to the top. Although this would be the most preferred disposition of templates, it would equally be possible to have two smaller or two larger templates on a given assembly. Furthermore, certain electrical switches and outlets are designed to be self-contained, that is, directly attached to electrical conductors instead of requiring a junction box. These require smaller apertures than junction boxes, and the template openings can be sized accordingly.

The preferred material for the rails 22, adapters 30, crossbars 44 and 50, slides 56 and 96, and templates 72 and 98 is aluminum. According to one embodiment of this invention: the end members 24 and 26 and their corresponding crossbars 44 preferably have a 1-inch (25 mm) square cross section and a 0.0625-inch (1.6 mm) wall; end members 24 and 26 are 22 inches (0.56 m) long, and crossbars 44 are 7 inches (0.18 m) long; the central members 28 have a 0.75-inch (19 mm) diameter, a 0.125-inch (3.2 mm) wall and a 20-inch (0.51 m) length, and their corresponding crossbars 50 are constructed of 0.5 inch (12.7 mm) rod with a length of 7.44 inches (0.19 m). When assembled with a 2-inch (50 mm) overlap between central and end members, the overall length of the device is 60 inches (1.52 m). For this embodiment, the slides 56 and 96 are fabricated from 0.125-inch (3.2 mm) thick stock and the templates 72 and 98 from 0.375-inch thick (9.5 mm) stock.

The sectional nature of template assembly 20 offers the user advantages which would not be provided by a comparable device with integral rails. For instance, it may be necessary in some situations to repetitively cut apertures in walls with insufficient space to place the template assembly 20 as supplied. In such cases, the device can be shortened by removing the central members 28 from either the first end members 24 or the second end members 26, cutting down the central members 28 to an appropriate length, and resecuring them to the end members through different holes 32 than previously. Also, the round crossbars 50 may be removed and reattached at other points to provide optimum strength and symmetry.

Furthermore, the user may completely disengage the central members 28 from end members 24 and 26 by removing the fasteners. The device is now dismantled into three short sections based on the central members 28 and each of the end members 24 and 26. Since no section exceeds 22 inches (0.56 m) in length, it is more readily portable than the complete assembly and may, for instance, easily be stowed in an aircraft luggage compartment and reassembled later.

Sometimes, it is necessary to make apertures for ganging together more than two electrical fixtures. In such a case, the invention can be used to cut out a first aperture, then it can be moved just far enough along to cut out an adjacent second area which extends the size of the first aperture.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. An assembly comprising:
   an elongate support; and
   a template made of a rigid material and having an aperture therein for guiding a cutting tool about the aperture, the template being removably attachable to the elongate support at multiple positions along a longitudinal axis of the elongate support;
   wherein the template is slidably disposed along the elongate support, and attachable to the support at predetermined increments along the elongate support.

2. An assembly comprising:
   an elongate support; and
   a template made of a rigid material and having an aperture therein for guiding a cutting tool about the aperture, the template being removably attachable to the elongate support at multiple positions along a longitudinal axis of the elongate support; wherein the elongate support comprises two parallel rails, and the template is slidably disposed along and removably attachable to the two rails.

3. An assembly comprising:
   an elongate support;
   a template made of a rigid material and having an aperture therein for guiding a cutting tool about the aperture, the template being removably attachable to the elongate support at multiple positions along a longitudinal axis of the elongate support; and;
   a second template made of a rigid material and having an aperture therein for guiding a cutting tool about the aperture.

4. The assembly of claim 3, wherein the second template is slidably disposed along the elongate support, and attachable to the support at predetermined increments along the elongate support.

5. An assembly comprising:
   an elongate support; and
   a template made of a rigid material and having an aperture therein for guiding a cutting tool about the aperture, the template being removably attachable to the elongate support at multiple positions along a longitudinal axis of the elongate support; wherein the elongate support comprises two parallel rails, and the template comprises a section extending between the two rails and including an aperture for receiving a router bit, said template section including an outer surface for placement against a workpiece and a shoulder extending from an inner surface of the section and surrounding the aperture.

6. The assembly of claim 5, wherein the shoulder is adapted for guiding a collar of the router with a bottom surface of the collar supported on the inner surface of the template section.

7. The assembly of claim 5, wherein the template section has holes in sides thereof, and the rails include a series of spaced holes, wherein the template section is removably attached to the template section by aligning the holes in the template section with selected holes in the rails and inserting a fastener in the holes.

8. The assembly of claim 5, wherein the rails are connected by crossbars to form a ladder-like elongate support.

9. An assembly comprising:
   an elongate support;
   a template made of a rigid material and having an aperture therein for guiding a cutting tool about the aperture, the template being removably attachable to the elongate support at multiple positions along a longitudinal axis of the elongate support; and
   a guide member at one end of the elongate support, the guide member comprising an outer surface perpendicular to the elongate support for abutment with a floor or wall surface.

10. The assembly of claim 9, the guide member comprises a bracket section attached to the elongate support and a protruding extension extending perpendicular to the elongate support, the extension including the outer surface and an opposed inner surface, wherein the extension is adapted for placement over an edge of a workpiece by contacting the inner surface with the workpiece edge.

11. An assembly comprising:
    an elongate support;
    a first template made of a rigid material and having an aperture therein for guiding a cutting tool about the aperture, the template being attached to the elongate support; and
    a second template made of a rigid material and having an aperture therein for guiding a cutting tool about the aperture, the template being attached to the elongate support;
    at least one of said first and second templates being removably attachable to multiple positions along the length of the elongate support.

12. The assembly of claim 11, wherein both the first and second templates are removably attachable to multiple positions along the length of the elongate support.

13. The assembly of claim 11, wherein the first and second templates have differently sized apertures for guiding of the cutting tool.

14. An assembly comprising:
    an elongate support comprising two parallel rails, each rail comprising a first rail section and a second rail section;
    a first template made of a rigid material and having an aperture therein for guiding a cutting tool about the aperture, the template being attached to the first rail sections of the parallel rails; and a second template made of a rigid material and having an aperture therein for guiding a cutting tool about the aperture, the template being attached to the second rail sections of the parallel rails;

wherein each first rail section is removably attachable to its respective second rail section.

15. The assembly of claim 14, wherein the first and second templates have differently sized apertures for guiding of the cutting tool.

16. The assembly of claim 15, wherein each rail further comprises a central rail section interconnecting the first and second rail section, the first and second rail sections being removably attachable to the central rail sections.

17. An assembly comprising:

an elongate support comprising two parallel rails; and a first template attached to the two parallel rails and comprising a rigid section extending between the two parallel rails, the rigid section having an aperture therein for receiving a bit of a router, wherein the template includes a recessed shoulder surrounding an entire perimeter of the rigid section aperture for guiding a collar of the router in which the router bit is retained;

wherein the template comprises the rigid section attached to the two parallel rails, and a template member attached to the rigid section, the template member having an aperture larger in size and surrounding the aperture of the rigid section.

18. An assembly comprising:

an elongate support comprising two parallel rails; and a first template attached to the two parallel rails and comprising a rigid section extending between the two parallel rails, the rigid section having an aperture therein for receiving a bit of a router, wherein the template includes a recessed shoulder surrounding an entire perimeter of the rigid section aperture for guiding a collar of the router in which the router bit is retained;

wherein the template member is removably attached to the rigid section.

19. An assembly comprising:

an elongate support comprising two parallel rails;

a first template attached to the two parallel rails and comprising a rigid section extending between the two parallel rails, the rigid section having an aperture therein for receiving a bit of a router, wherein the template includes a recessed shoulder surrounding an entire perimeter of the rigid section aperture for guiding a collar of the router in which the router bit is retained; and a second template attached to the two parallel rails, the second template comprising a rigid section extending between the two parallel rails, the rigid section having an aperture therein for receiving a bit of a router, wherein the rigid section includes a recessed shoulder surrounding an entire perimeter of the aperture for guiding a collar of the router in which the router bit is retained, wherein the apertures and recessed shoulders of the first template rigid section are differently sized.

20. The assembly of claim 18, wherein both the first and second template are removably attachable to the parallel rails at multiple positions along a length thereof.

21. The assembly of claim 18, wherein edge sections extend from the rigid sections of the templates and wrap around the parallel rails.

22. The assembly of claim 21, wherein the edge sections include holes for alignment with sets of holes in the parallel rails, the holes adapted for receiving fasteners.

23. An assembly comprising:

elongate support comprising two parallel rails having a longitudinal axis;

a template attached to the two parallel rails and comprising a rigid section extending between the two parallel rails, the rigid section having an aperture therein for guiding a cutting tool about the aperture; and a guide member at an end of the assembly, the guide member comprising bracket sections removably attached to the parallel rails, and a planar central section extending between the bracket sections, the planar central section including a protruding extension, wherein the bracket sections are attachable to the parallel rails in a first position, such that the protruding extension protrudes in a first direction perpendicular to said longitudinal axis, and the bracket sections are attachable to the parallel rails in a second position, such that the protruding extension protrudes in a second direction perpendicular to said longitudinal axis and opposite to said first direction.

24. A method of cutting a junction box aperture in a vertical wall, comprising:

providing a template assembly comprising an elongate support comprising two parallel rails, and a first template attached to the two parallel rails and comprising a rigid section extending between the two parallel rails, the rigid section having an aperture therein for receiving a bit of a router, wherein the first template includes a recessed shoulder surrounding an entire perimeter of the rigid section aperture;

adjusting the first template along the parallel rails to correspond to a desired height of the aperture;

positioning vertically the template assembly so that an end rests on the floor and a surface of the rails contact the wall; and operating the router to cut the junction box aperture while guiding the router collar against the recessed shoulder about the perimeter of the rigid section aperture in the first template.

25. The method of claim 24, wherein the template assembly further comprises a second template attached to the two parallel rails and comprising a rigid section extending between the two parallel rails, the rigid section having an aperture therein for receiving a bit of a router, wherein the second template includes a recessed shoulder surrounding an entire perimeter of the rigid section aperture, and the method further comprises:

positioning vertically the template assembly so that an end rests on the floor and a surface of the rails contact the wall, such that the second template is aligned with a desired position of a second junction box aperture; and operating the router to cut the second junction box aperture while guiding the router collar against the second template recessed shoulder about the perimeter of the rigid section aperture in the second template.

* * * * *